United States Patent
Hedges

[11] 3,870,405
[45] Mar. 11, 1975

[54] HELMET SIGHT VISORS
[75] Inventor: George D. Hedges, St. Paul, Minn.
[73] Assignee: Honeywell Inc., Minneapolis, Minn.
[22] Filed: June 12, 1973
[21] Appl. No.: 369,357

[52] U.S. Cl............ 350/294, 350/200, 350/298, 2/14 B
[51] Int. Cl. ............................................ G02b 5/10
[58] Field of Search ........... 350/200, 201, 288, 299, 350/293, 294, 298; 2/14 B

[56] References Cited
UNITED STATES PATENTS
3,589,796  6/1971  Schaefer............................ 350/201
3,787,109  1/1974  Vizenor............................. 350/298

Primary Examiner—John K. Corbin
Assistant Examiner—Michael J. Tokar
Attorney, Agent, or Firm—Charles J. Ungemach; Albin Medved

[57] ABSTRACT

A visor for use as an optical element in a helmet-mounted sight is described. The visor has inner and outer surfaces which are sections of cofocal paraboloids of revolution. A method of constructing such a visor utilizing a female mold of predetermined shape and an acrylic plastic blank of predetermined thickness vacuum drawn into the blank is disclosed.

6 Claims, 6 Drawing Figures

PATENTED MAR 11 1975                    3,870,405

HELMET SIGHT VISORS

BACKGROUND OF THE INVENTION

This invention relates generally to the optical portion of head-mounted sighting systems and more particularly concerns sighting systems which use a semi-reflective, semi-transparent combining surface having a shape defined by a section of a paraboloid of revolution as a primary optical element in a display system.

Such systems typically operate with a small light source placed so that its image is effectively centered at the focal point of the paraboloid of revolution defined by the combining surface. Light emitted from the source is then reflected from the combining surface to produce a collimated image. "Collimated image" as used herein refers to an image formed of light rays all of which are substantially parallel to one another. Such a "collimated image" appears to an observer to be located at infinity.

An example of a system of the type described above is shown in U.S. Pat. application Ser. No. 266,995, filed June 28, 1972, and also assigned to the present assignee. In the system described therein a reticle pattern is projected onto the inner surface of a helmet visor or faceplate. An observer wearing the helmet views a reticle pattern superimposed at infinity on the scene which he views through the visor. A system of the type shown in U.S. Pat. application Ser. No. 266,995 has a number of important advantages. Among them are the elimination of mechanical sight pieces which obstruct the pilot's view, the elimination of a number of optical elements, and the symmetrical nature of the visor which makes the system useable for sighting with either eye. On the other hand, one drawback encountered in using the system in certain environments is caused by secondary reflection. Secondary reflection occurs because a portion of the light emitted from the light source passes through the inner visor surface, but is reflected by the outer visor surface.

The reflected light produces an image formed by rays not parallel to the rays reflected by the inner visor surface. Such secondary reflection results in blurring of the reticle image or in the appearance of a "ghost" image somewhat displaced from the primary image created by inner surface reflection. This is a distraction to observers using the system and may result in inaccuracies in aiming. In other applications, where a cathode ray tube or other information display source is used in the system rather than a reticle image, presence of secondary reflections could result in making the information difficult or impossible to read.

The present invention is an improvement in visor construction and a process for constructing improved visors in which the blurred or "ghost" image due to secondary reflection is eliminated.

It is therefore a primary object of the present invention to provide an improved visor or combining element for use as an optical element in head-mounted display apparatus in which secondary reflections of light from the outer visor surface do not degrade the primary image created by the reflection from the inner surface.

SUMMARY OF THE INVENTION

These and other objects are attained in a visor which has a concave inner surface whose shape is a first paraboloid of revolution symmetrical about a first axis. The visor also has an outer surface defined by a shape which is a second paraboloid of revolution symmetrical about a second axis. The visor is constructed so that the first and second axes are substantially coincident. In addition, the inner and outer surfaces of the visor are substantially cofocal.

BRIEF DESCRIPTION OF THE DRAWINGS

Other objects and advantages of the present invention will become apparent upon reading the following detailed description and upon reference to the drawings in which.

While the invention will be described in connection with a preferred embodiment and method, the scope of the invention is not limited to that embodiment or method. On the contrary, it encompasses all alternatives, modifications, and equivalents as may be included within the spirit and scope of the invention as defined by the claims.

DETAILED DESCRIPTION OF THE INVENTION

Figure 1:
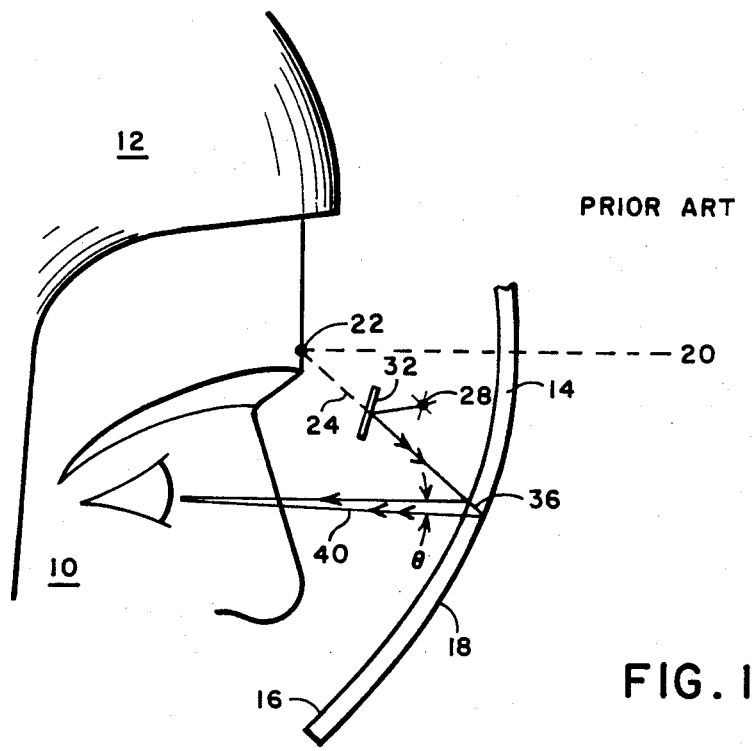
FIG. 1 is a simplified sketch of an observer and a head-mounted sight showing a cross-section of a prior art visor having substantially constant thickness throughout and an inner surface which is a section of a paraboloid of revolution.

FIG. 1 illustrates a prior art head-mounted sighting system in which the problem of secondary reflection occurs. In that figure, an observer generally designated observer 10 wears a helmet 12. Helmet 12 is mechanically connected to a visor 14 (through means not shown) so that the geometrical relationship between visor 14 and helmet 12 is maintained substantially constant. Visor 14 is, for simplicity, shown in cross-section. Visor 14 has an inner surface 16 which is a section of a paraboloid of revolution that is, a section of a surface generated by rotating a parabola about its axis. In section, surface 16 appears as a segment of a parabola. Visor 14 has a substantially constant thickness throughout. In a typical application, visor 14 may be constructed of a material highly transparent to visible light, such as glass or acrylic plastic. Surface 16 may be coated or tinted to increase its reflectivity and decrease its transmissivity or the material from which visor 14 is made may contain a dye to reduce its transmissivity. Since visor 14 is transparent but inner surface 16 has a non-zero reflectivity, visor 14 may be utilized as a combining element.

An axis 20 is shown in FIG. 1. Axis 20 is the axis of the paraboloid of revolution of which inner surface 16 is a section. A focal point 22 representing the focal point of the paraboloid of revolution used to generate surface 16 is shown. An illustrative ray 24 emanates from focal point 22 and impinges upon surface 16. It is reflected by inner surface 16. It is characteristic of the reflection of rays emanating from a focal point of a parabolic surface that the rays will be reflected parallel to the optical axis. Therefore the reflected portion of ray 24 is shown parallel to axis 20.

Illustrative ray 24 represents a ray coming from an image centered at the focal point. In actual practice, the light source used to generate the image will not usually be placed at the focal point. Given preferred inner surface focal lengths and preferred visor placements, the focal point is in close proximity to the forehead of observer 10. Therefore a light source and mirror combination is used to effectively place the virtual image of the source at focal point 22. In FIG. 1, this technique is illustrated by a light source 28 which projects light rays to a mirror 32. By appropriate placement of light source 28 and mirror 32, the virtual image of the light source can be centered at focal point 22. This will give the same optical effect as having light source 28 itself centered at the focal point.

During operation of the system of FIG. 1, ray 24 and other rays emanating from source 28 will strike inner surface 16. A portion of these rays will be reflected back parallel to axis 20 creating a collimated image which may be viewed by observer 10. However, a portion of the light represented by ray 24 will be transmitted through inner surface 16 and will impinge upon surface 18. A portion of the light reaching surface 18 will be reflected back toward observer 10. The portion transmitted through inner surface 16 is represented by an extension 36 of ray 24. A ray 40 in FIG. 1 represents light reflected from outer surface 18. The light reflected from surface 18 will not be reflected parallel to that reflected from surface 16. The angle between reflected rays is identified as $\theta$ in FIG. 1. The result is that observer 10 may see a blurred or ghost image caused by the secondary reflection as well as the collimated image erected by reflection from surface 16.

Figure 2:
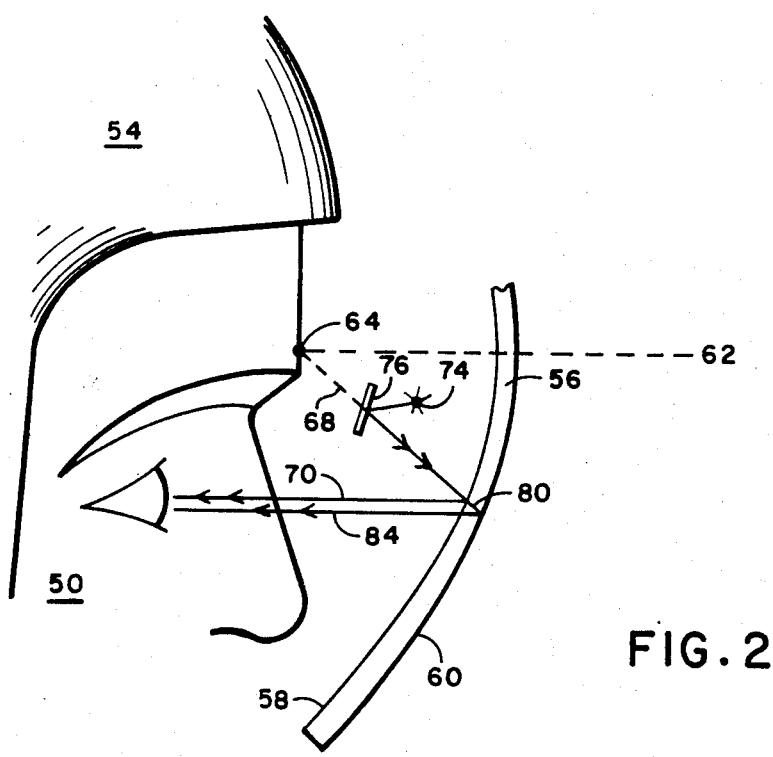
FIG. 2 is a simplified sketch of an observer and a head-mounted sighting system showing a cross-section of the improved visor of applicant's invention.

In contrast to FIG. 1, FIG. 2 illustrates the use of an improved visor which is applicant's invention. In FIG. 2, an observer 50 wears a helmet 54. Mounted in fixed relation to helmet 54 is a visor 56 having an inner surface 58 and an outer surface 60. The inner surface 58 is a section of a paraboloid of revolution formed by revolving a parabola about an axis 62. Inner surface 58 is a partially reflective, partially transmissive surface. The paraboloid of revolution of which inner surface 58 is a section has a focal point 64.

Outer surface 60 is also a section of a paraboloid of revolution whose axis is coincident with axis 62 and whose focal point is coincident with focal point 64. An illustrative ray 68 emanates from focal point 64 and strikes inner surface 58 at an angle. In actual practice, a light source 74 and a mirror 76 will be used in the manner described in the discussion of FIG. 1 to create a virtual image centered at focal point 64.

A portion of the light represented by ray 68 will be reflected by inner surface 58. The portion of the light reflected is shown as ray 70 in FIG. 2. Ray 70 will be reflected parallel to axis 62 and a collimated image will be erected by the rays which are reflected from the inner surface 58. This will occur in essentially the same way as described for the reflection of ray 24 of FIG. 1. The collimated image composed of rays reflected from inner surface 58 will appear to the observer to be superimposed at infinity on the scene he views through visor 56.

A portion of the light represented by ray 68 will be transmitted through inner surface 58 rather than reflected. This portion is shown as extension 80 in FIG. 2. Of the portion transmitted through inner surface 58, a fraction will be reflected upon reaching outer surface 60. Since outer surface 60 is substantially cofocal with inner surface 58, the light rays emanating from focal point 64 and reflected by outer surface 60 will also be transmitted back parallel to axis 62. An example of one such ray is ray 84 in FIG. 2.

The rays from source 74 which pass through surface 58 and are reflected by surface 60 will form a second collimated image somewhat displaced from the collimated image formed by those which are reflected at surface 58 but parallel to it. However, when a visor of the type illustrated in FIG. 2 is used, the observer will not discern a fuzziness or ghost image as a result of the displacement of these two collimated images as one might expect. Because each image is collimated, each appears to be coming from infinity. The linear displacement between the two images is negligible at infinity. The eye can in effect sense angular divergence, but since there is no angular difference in the pointing direction of the two collimated images, they appear superimposed. The eye therefore resolves the images into a sharp reticle pattern, and the secondary reflection problem is solved.

The above explanation omits, in the interest of clarity, any mention of the effect of diffraction on the operation of the improved visor. In actuality, those rays transmitted through inner surface 58 but reflected back towards observer 50 by outer surface 60 will be diffracted by a very small amount. Diffraction occurs each time these rays pass through the air/plastic interface at inner surface 58. This minute amount of diffraction is negligible for all practical purposes, and construction of a visor which has substantially cofocal inner and outer surfaces will effectively solve the secondary reflection problem.

While the improved visor may be constructed of any transparent material which has an inner surface with significant reflectivity and has sufficient transmissivity to allow the visor to function as a combining glass within the limits of light source and ambient light intensities, preferred ranges of reflectivity and transmissivity have been discovered for use in daylight applications. Constructing the visor of uncoated tinted acrylic plastic having a transmissivity of 10–28% results in a number of significant advantages. The reflectivity of the uncoated plastic may range from 3–5%. Furthermore, the low transmissivity which matches this reflectivity provides protection against reflection of so much ambient light from the observer's face that light source image becomes obscured. Using uncoated material minimizes variations in reflectivity, eliminates the expensive coating process, and provides a more durable surface.

In addition to preferred reflectivity and transmissivity values for use in construction of the visor, applicant has discovered that a specific range of visor thicknesses is particularly advantageous. The preferred range is between 0.050–0.150 inches thick at the common axis of the inner and outer paraboloids. Stated another way, the difference between inner and outer surface focal lengths should be between 0.050–0.150 inches. Thicknesses greater than 0.150 inches tend to result in heavy, bulky visors in which optical aberrations become a problem. On the other hand, visors with thicknesses less than 0.050 inches lack the structural strength necessary for the certain applications, particularly those in which the visor doubles as a pilot's face shield.

Figure 3A:
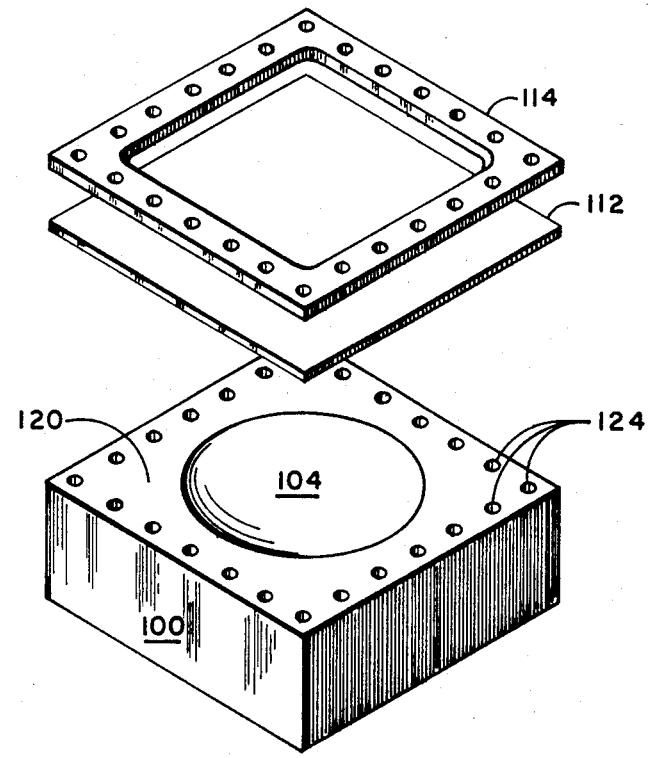
FIG. 3A is a perspective view of one embodiment of apparatus essential to applicant's method of producing the improved visor.
Figure 3B:
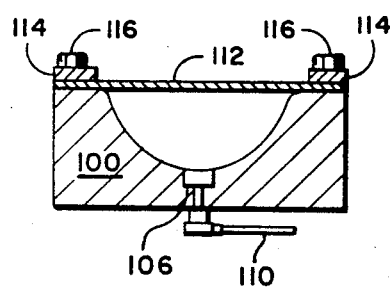
FIG. 3B is a cross-sectional view of the apparatus used in constructing the improved visor before the vacuum drawing step occurs.
Figure 3C:
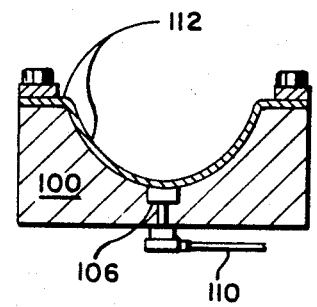
FIG. 3C is a cross-sectional view of the apparatus of FIG. 3B after vacuum draw has occurred.

In addition to discovering the improved visor construction, applicant has developed a highly effective method of constructing visors with substantially cofocal inner and outer surfaces. FIGS. 3A–3C illustrate one embodiment of apparatus for constructing the improved visor using this method. In these Figures, a mold block designated 100 having a female cavity 104 whose shape is generally defined by a paraboloid of revolution is shown. Centered in cavity 104 at what would be the vertex of the paraboloid of revolution defining the cavity surfaces is an orifice or porous section 106. A vacuum line 110 is shown connected to orifice 106 in FIGS. 3B and 3C. A generally flat acrylic plastic sheet 112 is also shown in FIGS. 3A through 3C. Acrylic plastic sheet 112 is molded into a visor blank and a portion of the blank is eventually used as the visor of applicant's invention. Additional elements in FIGS. 3A through 3C are a clamping ring 114 and clamping screws 116. The clamping ring is used to fasten the edges of acrylic sheet 112 and seal them against a flat portion 120 of the mold 100. Matching threaded holes 124 are drilled and tapped in mold 100 to match the holes in clamping ring 114.

FIGS. 3A and 3B illustrate the preparation of apparatus which precedes the visor forming process. In preparation, acrylic sheet 112 is clamped to clamping ring 114 and drilled with holes which match the holes in ring 114. Clamping screws 116 are then used to fasten the ring 114 and sheet 112 to mold 100. Vacuum line 110 is then connected to a vacuum pump or other vacuum drawing apparatus not shown. The mold, acrylic sheet and associated apparatus are then placed in an oven and allowed to soak for approximately 3 hours at an elevated temperature between 250°F and 300°F. The temperature range chosen is a function of the characteristics of the material to be drawn. The soaking temperature must be chosen high enough so that the plastic is sufficiently soft to be drawn, yet low enough to prevent melting. The step of soaking at an elevated temperature softens sheet 112, prepares it for drawing and eliminates temperature gradients in the sheet and other apparatus. During the soaking process the pressure at vacuum line 110 is maintained approximately equal to that of the surrounding atmosphere so that sheet 112 will remain in a reasonably flat condition.

At the end of this preparation period, a vacuum pump is attached and is used to slowly draw the acrylic sheet down into the mold cavity 104. In the preferred process, this vacuum draw step is controlled to take place slowly, and requires approximately 20 seconds or longer. This vacuum drawing is continued until the line of contact between the sheet 112 and the surface of cavity 104 reaches the lowest point in the cavity. The drawn visor blank is then annealed by placing it in an oven for approximately 16 hours at 160° ± 15°F. The visor blank may then be removed from the mold, and be polished and burnished to remove mold marks and create a highly polished outer surface. The best areas for imaging are then selected and cut from the visor blank.

In one specific successful use of this process, the paraboloid of revolution used to define the surface of cavity 104 has a focal length of 1.50 inches and the cavity had a depth of 3.60 inches. With a mold cavity of these dimensions, an acrylic sheet with a thickness of 0.1875 inches was found to produce visor blanks having substantially cofocal inner and outer parabolic surfaces.

Applicant has discovered that, for a mold cavity of known depth, whose surface is defined by a paraboloid of revolution of given focal length, an important parameter of the visor forming process is constant for a significant range of acrylic sheet thicknesses. This parameter is called the "thinning ratio" and is defined as the ratio of the thickness of the drawn visor blank at the vertices of the parabolic surfaces (also the lowest point in the mold) divided by the thickness of the original sheet. A cavity with the specific dimensions given above, where the paraboloid of revolution had a focal length of 1.50 inches and a depth of 3.60 inches was found to have a thinning ratio of approximately 0.50 or 50%.

Figure 4:
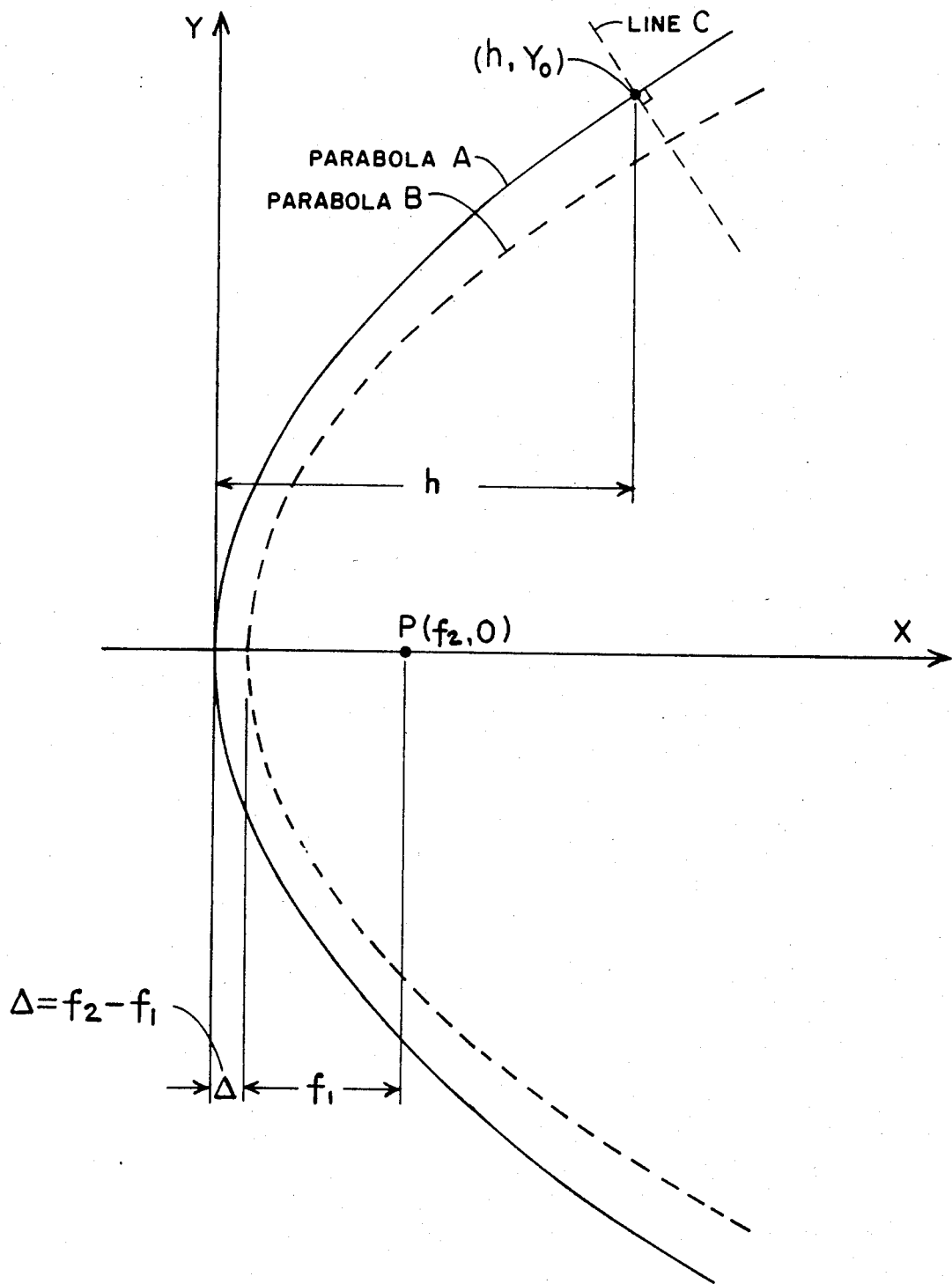
FIG. 4 illustrates the relationship between the geometry of the mold used for constructing the improved visor and the thickness of the plastic sheet which may be used in the method of constructing the visor.

Once this thinning ratio has been defined for a particular mold cavity, its constancy can be used to approximately determine the thickness of acrylic plastic which will produce a visor blank having cofocal inner and outer surfaces. This may be done graphically by sketching families of cofocal parabolas or semi-analytically. One means of approximately determining the thickness is illustrated in FIG. 4. FIG. 4 shows a two-dimensional Cartesian coordinate system having $x$ and $y$ axes. A solid line parabola A having its vertex at the origin of the coordinate system, and positioned so that it is symmetrical about the $x$-axis is shown in FIG. 4. Parabola A represents a cross section of a female mold cavity surface. Also shown in FIG. 4 is a cofocal coaxial dashed line parabola labelled parabola B. This represents a cross section of an inner surface of a visor having cofocal inner and outer surfaces which are paraboloids of revolution. Since parabolas A and B are cofocal, their focal points are represented by a single point P with coordinates $(f_2, 0)$. Since parabola A has its vertex at the origin its focal length is $f_2$. Parabola B is shown in FIG. 4 as having a focal length $f_1$. Therefore the distance between the inner and outer surfaces at the vertices of these parabolic sections will be $f_2 - f_1$. The thinning ratio for a visor with inner and outer surfaces whose cross sections are represented by parabolas B and A respectively may be expressed as:

$$\text{thinning ratio} = (f_2 - f_1/d) \quad (1)$$

where $d$ is the thickness of the acrylic sheet before the molding process occurs and $f$ and $f_1$ are the focal lengths of the paraboloids of revolution defining the outer and inner surfaces of the finished product, respectively. Using equation (1) and one further assumption, the approximate thickness $d$ of an acrylic sheet which will produce the improved visor can be determined. The needed assumption is that the sheet undergoes differential thinning in the drawing process and remains at approximately its original thickness near the top of the mold. If this is true, an expression for $d$ can be calculated using equations for parabolas A and B and determining the distance between them at an $x$-coordinate equal to the cavity mold depth.

Since parabola A has its vertex at the origin, is symmetrical about the x-axis, and has focal length $f_2$, its equation will be as follows:

$$y_A^2 = 4f_2 x_A \qquad (2)$$

Parabola B is cofocal and coaxial with parabola A with a lesser focal length of $f_1$. Its equation will be:

$$y_B^2 = 4f_1 (x_B - f_1 + f_2) \qquad (3)$$

Inspection of FIG. 4 establishes that the distance between parabola A and parabola B at the vertices of the parabolas is given by $\Delta = f_2 - f_1$. This thickness $\Delta$ corresponds to the thickness of the completed visor blank at the bottom of the mold cavity.

The depth of the mold is represented by $h$ in FIG. 4. Substituting $h$ for $x_A$ in equation (2), the y-coordinate of the parabola edge can be determined. Using the negative of the slope of parabola A at $(h, y_o)$ and the general equation for a line through a particular point in two dimensions, a line C through the point $(h, y_o)$ perpendicular to parabola A is given by the expression:

$$(y - y_o) = (-y_o/2f_2)(x - h) \qquad (4)$$

where $h$ is the depth of the mold and $y_o$ is the y-coordinate of parabola A for $x = h$.

Since the object is to derive an expression for the distance between parabolas A and B at the edge of the mold and set this equal to $d$, the next step is to determine the point of intersection of line C and parabola B. This is accomplished by equating $y$ and $y_B$ in equations (3) and (4) and substituting to eliminate $y_B$ from equation (3), which yields:

$$(-y_o/2f_2 (x_B - h) + y_o)^2 = 4f_1 (x_B - f_1 + f_2) \qquad (5)$$

By definition, the thinning ratio is equal to the ratio of the thickness of the visor at the vertex to the thickness of the original sheet. Since it has been assumed that the thickness of the original sheet is approximately equal to the thickness of the finished blank at the top of the parabolic section, the distance along the line defined by equation (4) between the points $(h, y_o)$ and $(x_B, y_B)$ is approximately equal to the numerator of the thinning ratio. The general equation for the distance between two points $P_1$ and $P_2$ in the two dimensional coordinate system is given by:

$$\text{Distance} = \sqrt{(x_1 - x_2)^2 + (y_1 - y_2)^2} \qquad (6)$$

where $P_1 = (x_1, y_1)$ and $P_2 = (x_2, y_2)$

Applying expression (6) to the distance between the point $(h, y_o)$ and a point on parabola B:

$$d = \sqrt{(x_B - h)^2 + (y_B - y_o)^2} \qquad (7)$$

Substituting for $y_B$ using equation (3) gives $$d = \sqrt{[x_B - h]^2 + [2(f_1(x_B - f_1 + f_2))^{1/2} - y_o]^2} \qquad (8)$$

The value for $d$ in equation (8) may now be substituted into equation (1). Equations (1) and (5) can then be solved simultaneously for $x_B$ and $f_1$ since $x_0$, $y_0$, $f_2$ and the thinning ratio are all known. After equations (1) and (5) are solved simultaneously for $x_B$, $y_B$ can be determined from equation (3). Then reapplying equation (6) to determine the distance between the point $(h, y_0)$ and $(x_B, y_B)$ will give the approximate thickness of the parabola. These steps effectively equate the thinning ratio of the mold with the ratio of the distance between the paraboloid of revolution defining the cavity surface and a second cofocal paraboloid of revolution at their vertices to the distance between the two paraboloids at a point on the paraboloid defining the cavity surface equal to the cavity depth.

Another way in which the approximate thickness for the acrylic sheet may be determined is by graphical solution of the problem. This involves drafting a first parabola defined by the cross section of the mold surface and constructing cofocal coaxial parabolas until the ratio of the distance between parabola vertices and the distance between the first parabola and cofocal parabola at the cavity depth equals the mold thinning ratio. After approximate determination by one of these two methods, a small additional amount of experimentation will define the sheet thickness necessary to achieve cofocal inner and outer surfaces.

It is now apparent that there has been provided, in accordance with the invention, an improved visor and method of constructing the visor which fully satisfies the objects, aims, and advantages set forth above. While the invention has been described in conjunction with specific embodiments and process steps thereof, it is evident that many alternatives, modifications, and variations will be apparent to those of skill in the art in light of the foregoing description. Accordingly it is intended to embrace all such alternatives, modifications and variations as fall within the spirit and broad scope of the appended claims.

What is claimed is:

1. A visor for use with a helmet sight system, which comprises:
  a concave inner surface whose shape is a first paraboloid of revolution having a first axis; and
  a convex couter surface whose shape is a second paraboloid of revolution having a second axis, said second axis being substantially coincident with said first axis, said outer surface and said inner surface being substantially cofocal, so that the reflections of a light ray from said inner surface and said outer surface will be substantially parallel.

2. The apparatus of claim 1 wherein said inner surface and said outer surface each have definable focal lengths, and the difference between the inner surface focal length and said outer surface focal length is within the range 0.050–0.150 inches.

3. The apparatus of claim 1 wherein said visor is constructed of transparent plastic and said inner surface has a reflectivity of 3–5%.

4. The apparatus of claim 3 wherein said plastic has a transmissivity of 10–28%.

5. A visor for use as an optical element in a helmet sight system, comprising:

a sheet of plastic material formed so that it has a concave surface defined by a paraboloid of revolution about a first axis, said concave surface having a first focal length, and a convex surface defined by a paraboloid of revolution about a second axis, said convex surface having a second focal length, said first and second axes being substantially coincident with one another, with the thickness of said sheet along said axes being equal to the difference between said first and second focal lengths, so that the reflections of a light ray from said inner surface and said outer surface will be substantially parallel.

6. The apparatus of claim 5 wherein the thickness of said sheet along said axes is in the range of 0.050 – 0.150 inches, and said inner surface has a reflectivity of 3–5%.

* * * * *